United States Patent
Danielson et al.

(10) Patent No.: US 6,875,811 B2
(45) Date of Patent: *Apr. 5, 2005

(54) SINGLE COMPOUND TONERS FOR USE IN POLYESTERS

(75) Inventors: Todd D. Danielson, Moore, SC (US); Jason Sprinkle, Woodruff, SC (US); Daniel Connor, Inman, SC (US); Donnie Hyder, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 159 days.

This patent is subject to a terminal disclaimer.

(21) Appl. No.: 10/140,700

(22) Filed: May 7, 2002

(65) Prior Publication Data

US 2003/0212172 A1 Nov. 13, 2003

(51) Int. Cl.$^7$ .............................. C08L 67/00; C08K 5/45
(52) U.S. Cl. ............................... 524/601; 524/84
(58) Field of Search ........................ 524/82, 84, 190, 524/601; 106/287.32

(56) References Cited

U.S. PATENT DOCUMENTS

| | | | | |
|---|---|---|---|---|
| 3,546,270 A | 12/1970 | Kirchmayr et al. | ......... | 260/465 |
| 3,634,320 A | 1/1972 | Metzner et al. | ......... | 260/45.85 |
| 3,809,707 A | 5/1974 | Hayinga et al. | ............. | 260/404 |
| 4,284,729 A | 8/1981 | Cross et al. | ................ | 521/158 |
| 4,359,570 A | 11/1982 | Davis et al. | ................ | 528/289 |
| 4,496,757 A | 1/1985 | Dexter et al. | ................ | 560/82 |
| 4,507,407 A * | 3/1985 | Kluger et al. | ................ | 521/113 |
| 4,601,725 A * | 7/1986 | Keller et al. | ................... | 8/403 |
| 4,617,374 A | 10/1986 | Pruett et al. | ................ | 528/288 |
| 4,619,990 A | 10/1986 | Elmasry | ..................... | 534/573 |
| 4,732,570 A | 3/1988 | Baumgartner et al. | ......... | 8/506 |
| 4,745,174 A | 5/1988 | Pruett et al. | ................ | 528/289 |
| 4,758,243 A * | 7/1988 | Rekers et al. | ................... | 8/627 |
| 4,845,188 A | 7/1989 | Weaver et al. | ............... | 528/272 |
| 4,920,169 A | 4/1990 | Avar | .......................... | 524/219 |
| 5,057,491 A | 10/1991 | Housley | ......................... | 505/1 |
| 5,057,627 A | 10/1991 | Edwards | ..................... | 568/618 |
| 5,372,864 A | 12/1994 | Weaver et al. | ........... | 428/36.92 |
| 5,384,377 A | 1/1995 | Weaver et al. | ............... | 525/437 |
| 5,442,086 A | 8/1995 | Krutak et al. | ............... | 558/401 |
| 5,543,083 A | 8/1996 | Sivik et al. | ................. | 252/403 |
| 5,591,833 A * | 1/1997 | Hines et al. | ................ | 534/607 |
| 6,605,126 B1 * | 8/2003 | Xia et al. | ....................... | 8/647 |
| 2002/0198297 A1 * | 12/2002 | Odorisio et al. | ............ | 524/186 |

FOREIGN PATENT DOCUMENTS

JP  2000-037761 A  *  2/2000
WO  WO 02/16497 A1  *  2/2002

OTHER PUBLICATIONS

Machine Translation of JP 2000–037761 A (2000).*
International Search Report; Form PCT/ISA/220 (Apr. 2002); dated Aug. 12, 2003.

* cited by examiner

Primary Examiner—Callie Shosho
(74) Attorney, Agent, or Firm—Terry T. Moyer; John E. Vick, Jr.

(57) ABSTRACT

Individual compounds that provide effective toning (or bluing) to combat yellowing within polyester articles (such as bottles, containers, and the like) are provided. Such a novel toner permits effective neutralization of yellowness while also providing highly desirable low haze and increased brightness due to a sharp absorption peak within the needed range of wavelengths (e.g., from about 565 to 590 nm) and a narrow half-height band width. Furthermore, such an individual compound is preferably liquid in nature and may thus be incorporated within an added ultraviolet absorber solution or shelf-stable dispersion to facilitate addition within target polyesters at various stages of production. The particular UV absorbers desired as additives within target polyesters also tend to exhibit certain yellowing effects that require attention as well. The inventive single bluing agent compound thus also accords effective neutralization of such UV absorber yellowing as well. Methods of production and liquid UV absorber/individual bluing agent formulations are also encompassed within this invention.

1 Claim, No Drawings

SINGLE COMPOUND TONERS FOR USE IN POLYESTERS

FIELD OF THE INVENTION

This invention relates to individual compounds that provide effective toning (or bluing) to combat yellowing within polyester articles (such as bottles, containers, and the like). Such a novel toner permits effective neutralization of yellowness while also providing highly desirable low haze and increased brightness due to a sharp absorption peak within the needed range of wavelengths (e.g., from about 565 to 590 nm) and a narrow half-height band width. Furthermore, such an individual compound is preferably liquid in nature and may thus be incorporated within an added ultraviolet absorber solution or shelf-stable dispersion to facilitate addition within target polyesters at various stages of production. The particular WV absorbers desired as additives within target polyesters also tend to exhibit certain yellowing effects that require attention as well. The inventive single bluing agent compound thus also accords effective neutralization of such WV absorber yellowing as well. Methods of production and liquid WV absorber/individual bluing agent formulations are also encompassed within this invention.

BACKGROUND OF THE PRIOR ART

It is a recurring well known problem that undesirable yellowing exists within polyester fibers and plastics. Furthermore, with the advent of adding UV absorbers within certain polyester containers and/or bottles as protectants for liquids and foodstuffs kept therein, this yellowing problem is compounded. Since UV absorbers absorb visible light most heavily in the low wavelength violet and indigo range of wavelengths, they produce a resultant yellow appearance within polyester. If such a plastic is clear and/or uncolored, the yellow appearance reduces the aesthetics thereof, particularly within thicker plastic portions (such as the bottom or bottlecap support within the neck of a polyester bottle), thus reducing the desirability of such an article from widespread commercial use.

The yellowing of the polyester by itself has been effectively reduced in the past, at least from a straightforward neutralization standpoint, through the utilization of certain types of toners that are incorporated into the target polyester in order to mask, hide, or neutralize the yellow color within the visible spectrum. Such toners for polyester must not exhibit extraction, must not be susceptible to degradation due to exposure to light, humidity, temperature, and other such drastic conditions. Such bluing agents should also exhibit a minimal degree of thermal degradation (or, conversely, excellent thermal stability) during polyester manufacture, desirably at any stage during plastic production, but acceptably at any stage of the article manufacturing process. In addition, the toner must have minimal adverse effects on the physical properties of the polyester polymer, such as in terms of reducing the intrinsic viscosity or transparency thereof.

One of the most prevalent compounds for this purpose is cobalt acetate. However, such a compound exhibits disadvantageous characteristics that limit its desirability for such an application. For example, cobalt acetate toned materials tend to be unstable during storage and are particularly susceptible to temperature and humidity, and tends to undergo an undesirable color shift toward yellow. Further, when high cobalt concentrations are needed to mask the yellow color of some polymers there is a tendency to impart a gray hue to the polymer. This grayness is believed, without intending on being bound to any specific scientific theory, to result from the broad range of wavelength over which this compound absorbs at a relatively high level. This effect appears to be attributable to the extremely broad half-height bandwidth thereof. As a result, and with such a relatively high absorption level over such a wide range of wavelengths, the brightness of the target polyester is compromised and the appearance thereof is dulled. Such a compound is also limited in its additive levels within polyesters by governmental mandate due to suspect effects of cobalt in relatively high amounts within such end-use articles, among other problems.

Additional toners include costly and rather suspect types within U.S. Pat. No. 4,745,174. Disclosed therein are certain 1-cyano-3H-dibenz-isoquinoline-2,7-diones that are effective as bluing agents generally; however, they are also expensive to manufacture and exhibit potential environmental and toxicological issues relative to their manufacture and use.

U.S. Pat. Nos. 5,384,377 and 5,372,864 both disclose mixed compound toner systems requiring red anthraquinones and blue anthraquinones. Such mixtures are polymerized into the target polyester (thereby exhibiting no migration within or therefrom) and provide a certain degree of effective neutralization of yellowing. However, as noted in greater detail below, such mixtures of compounds also generate a dullness or grayness within the target polyester that is undesirable to a certain aesthetic level. As with the cobalt acetate above, the combination of red and blue color synergistically produce a broad absorption spectrum with a rather wide half-height bandwidth. The resultant absorption peaks exhibited by such a combination are favorable to yellow neutralization, however, the high absorption levels exhibited for wavelengths not complementary to the generated yellow within the target polyester also dulls the resultant plastic. Furthermore, this combination is primarily utilized through polymerization within the target resin at the polyester polymerization stage. Although such compounds may be introduced at later stages of polyester production, these compounds are not disclosed as liquids, only as solid colorants. Thus, in addition to the prior art discussed above, nothing has been disclosed providing liquid solutions or dispersions of such combinations with UV absorbers to provide an easy-to-incorporate and/or -handle formulation of such type for the polyester manufacturer. To date, nothing has been taught nor fairly suggested providing a single compound for bluing purposes within polyesters that provides effective yellowness neutralization as a heavy metal-free liquid additive, and exhibits a narrow half-height bandwidth in order to provide a finished clear polyester with very high brightness and hue angle levels.

OBJECTS OF THE INVENTION

Therefore, an object of the invention is to provide a single component bluing agent for polyester fibers and articles that exhibits very low extraction therefrom, excellent anti-yellowing results therein (within the plastic alone or in combination with a yellowing additive, such as an UV absorber compound), and high brightness (c value) levels and whiteness (L value) levels (in accordance with CIELab standards). Another object of the invention is to provide a liquid bluing agent exhibiting $\lambda_{max}$ measurements between 565 and 590 nm wavelengths and half-height bandwidths within a narrow range of at most about 115 nm. Additionally, it is an object of this invention to provide a liquid dispersion or solution bluing agent/UV absorber formulation for introduction within polyester resins for UV protection and anti-yellowing properties.

DETAILED DESCRIPTION OF THE INVENTION

Accordingly, the present invention encompasses a polyester fiber or article comprising at least one bluing agent and optionally at least one ultraviolet light absorbing compound; wherein said bluing agent exhibits a single absorption peak and a $\lambda_{max}$ between 565 and 590 nm within said polyester fiber or article; and wherein said bluing agent is a single compound and exhibits a half-height bandwidth of at most 115 nm in relation to said single absorption peak. The present invention further encompasses a method for providing anti-yellowing benefits to a polyester fiber or article wherein said fiber or article optionally comprises at least one ultraviolet absorber compound, said method comprising providing a molten polyester formulation, introducing a bluing agent to said molten polyester wherein said bluing agent exhibits a single absorption peak and a $\lambda_{max}$ between 565 and 590 nm within said polyester fiber or article; and wherein said bluing agent exhibits a half-height bandwidth of at most 115 nm in relation to said single absorption peak, and allowing the resultant polyester/bluing agent formulation to cool into a predetermined shape or form. Furthermore, this invention encompasses a liquid solution or dispersion comprising at least one ultraviolet absorber compound and at least one bluing agent, wherein said bluing agent exhibits a single absorption peak and a $\lambda_{max}$ between 565 and 590 nm within said polyester fiber or article; and wherein said bluing agent exhibits a half-height bandwidth of at most 115 nm in relation to said single absorption peak For the purposes of this invention, the term "bluing agent" is synonymous with "toner for polyester". Such a term thus encompasses a compound that combats and neutralizes the yellowing of either polyester alone or a yellowing polyester comprising any further additives, including any yellowing additives (such as UV absorbers, as one example). Generally, yellow colorations within polyester, intended to be colorless and thus clear and transparent within the visible spectrum, create aesthetic problems within target resins. Such yellow colorations absorb within the visible and ultra-violet spectrum at about 390 to about 450 nm. As noted above, neutralization of such unwanted color is thus necessary within the visible spectrum to provide a pleasing appearance, particularly in thicker portions of target polyester articles and/or fibers. The inventive selection of a single component toner for this purpose has been found, unexpectedly, to be possible upon determination of a specific single compound that absorbs within the needed wavelength range (565 nm to 590 nm; more preferably from 565 to 580 nm; most preferably from about 570–575 nm). In addition, it was determined that such a variable as absorption was not the only necessary property to provide the best overall bluing characteristics to combat undesirable yellowing problems. Thus, a single peak (rather than multiple peaks), facilitated addition and control of the needed final neutralization result. In addition, such a single peak required a very narrow half-height bandwidth for a number of reasons. Most importantly, such a narrow range permits a brighter result in the target resin, and well as a reduction in grayness therein. Prior art bluing agents tend to provide excellent neutralization of yellowness within target polyesters; however, the half-height bandwidth of such additives are so broad that absorption values are extensive over a broader range of wavelengths to the extent that such toners not only effectively neutralize the yellowness, but also dull the finished plastic article as well. Thus, the inventive toner has remedied all of these prior problems and unexpectedly accorded the industry with a single compound that overcomes such dulling and graying in order to provide a highly desirable, aesthetically pleasing clear polyester fiber and/or article. It is important to note that the graying ability of prior art bluing agents contributed significantly to their overall abilities to combat yellowness and thus such broad half-height bandwidth properties were normally considered necessary to such an end result. Unexpectedly, it has now been determined that a narrower characteristic can actually function properly as a suitable bluing agent while also reducing dullness in a finished polyester, particularly clear polyester, article. However, it is foreseen that too narrow a half-height bandwidth would produce unwanted different colors (such as, for example, green colorations) within the finished article due to a potential lack of proper complementary absorption capabilities from a broad enough perspective to combat yellowness completely. The specific limit on narrowness in such a situation is not known, however, although, again, it is foreseen that a limit to the effectiveness upon too narrow a measurement does exist.

Other important benefits from such an inventive single compound polyester toner include low haze results within clear articles (including pre-form as well as finished bottles), sufficiently high absorption levels for highly effective yellow neutralization at relatively low toner loading levels, and proper hue angle readings. Haze is a very important property of polyester articles, particularly for food stuff and liquid containers, as the consumer expects and generally requires the ability to view the contained matter therein when stored. For that matter, such contained liquid and/or foodstuffs also generally require the presence of UV absorbers within the polyester as well in order to prevent degradation thereof due to UV exposure. Such UV absorbers, as noted above, can discolor (yellow) the resin thereby necessitating the presence of such bluing agents for evident reasons. Thus, with the presence of additives for these purposes, the potential for transparency reduction in the article increases. Such a requirement is not limited to finished containers, but also pre-form (pre-blown) articles as well. Thicker pre-form articles must exhibit minimal haze in order to ensure proper re-heating and blowing to consequently form the finished article, not to mention effective transparency within the finished article as well. The inventive single compound toner, to the contrary, does not deleteriously effect such a property, either in pre-form or finished articles. Such a compound also can be added in very low amounts, from about 0.1 to about 100 ppm of the total parts of polyester (such as polyethylene terephthalate as one highly preferred, non-limiting example; others include PEN, polybutylene terephthalate, polytrimethylene terephthalate, polylactic acid, and the like), preferably from about 1 to about 50 ppm, more preferably from about 1.5 ppm to about 40, and most preferably from about 2 to about 25 ppm. Even at such low loadings, the high absorption levels within the needed range of wavelengths, as noted above, provide sufficient yellowness neutralization heretofore unseen for single compound toners. The hue angle results contribute to the overall brightness of the resin as well, thereby according a highly desirable end product. The level of loadings depends highly upon the strength of the colorant needed to provide the desired anti-yellowing effect while also not contributing an excess in blue or violet discoloration to the target resin. Furthermore, the end-use itself may justify higher loadings (such as as high as 100 ppm) if the thickness of the target article is sufficiently low such that the amount of yellowing additives is high throughout and discoloration by bluing agents is unlikely at higher loading levels.

The class of compounds that exhibit such effective and beneficial characteristics include violet and bluish violet colorants, preferably liquid in nature, and thus include a chromophore with poly(oxyalkylene) pendant chains thereon of at least 3 moles of oxyalkylene per alcohol chain. Such colorants are generally referred to as polymeric colorants, disclosed on a general basis within numerous patents assigned to Milliken & Company, and marketed by the same corporation under the tradenames ClearTint®, and ReacTint®, as examples. Preferred are polymeric violet colorants that exhibit a $\lambda_{max}$ within the proper range of wavelengths (i.e., between 565 and 590 nm, as noted above). Such colorants should also preferably exhibit a single peak within this range as well as a half height bandwidth of at most 115 nm, more preferably at most 110 nm, still more preferably at most 105 nm, and most preferably at most 100 nm, all in order to provide the best overall anti-yellowing capabilities with simultaneous provision of high brightness and low dulling of target clear polyester resins. The more preferred colorant types are violet colorants having thiophene-based chromophores and polymeric chains thereby making the colorants liquid at room temperature and in a non-diluted, pure state. The most preferred types are selected from those conforming with the structure of Formula (I), all providing violet shades:

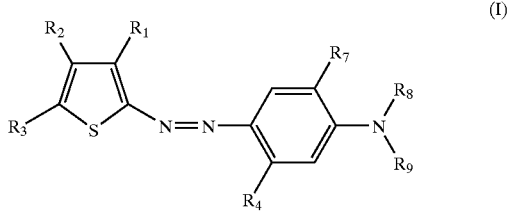

(I)

wherein $R_1$, $R_2$, $R_3$, $R_4$ and $R_7$ are the same or different and independently selected from the group consisting of hydrogen, hydroxyl, straight $C_1$–$C_{20}$ alkyl, $C_1$–$C_{20}$ alkoxy, cyano, amino, phenyl, substituted phenyl, cycloalkyl, carboxyl, amido, and branched $C_1$–$C_{20}$ alkyl groups. Groups $R_6$ and $R_7$ represent, $C_1$–$C_8$ poly(oxyalkylene) groups (including monomers such as, preferably, ethylene oxide, propylene oxide, and any combinations thereof). The ratios in the following table regarding such polyoxyalkylene groups are thus indicate the following: ethylene oxide (EO)/propylene oxide (PO)/ethylene oxide (EO) (if the third number is present, another group of EO is present; if not then only one group of EO capped with PO is present). The following table further shows the most preferred types and #1 is the preferred embodiment (the numbers for $R_8$ and $R_9$ below are the sums of both groups, for example 2/15/5 indicates 1 mole of EO, 7.5 moles of PO, and 2.5 moles of EO per group):

TABLE 1

| Colorant | $R_1$ | $R_2$ | $R_3$ | $R_4$ | $R_7$ | $R_8$ and $R_9$ |
|---|---|---|---|---|---|---|
| 1 | CN | Me | CN | Me | H | 2/15/5 |
| 2 | CN | Me | CN | Me | H | 2/10/8 |
| 3 | CN | Me | CN | Me | H | 2/7/6 |
| 4 | CN | Me | CN | Me | H | 2/10/6 |

These polymeric colorants have found utility in the past as coloring agents for polyurethanes and as fugitive tints for textiles (the end-use dependent on the degree of polyoxyalkylenation of the base chromophore), as taught within U.S. Pat. Nos. 4,507,407 and 4,601,725. However, such colorants have not been taught or fairly suggested as proper bluing agents for combatting and/or neutralizing yellowness within polyester (or UV absorber-containing polyester). As noted above, it was recently determined that polyester bluing agents necessarily exhibited certain absorption wavelength ranges and narrow half height bandwidths in order to provide the best overall anti-yellowing, brightness and grayness characteristics within target clear polyesters. The most preferred such inventive bluing agent, Example 1, above, when present within polyester resins at a loading of about 300 ppm (a sufficient amount to provide actual violet colorations within a plaque of polyester, and thus at a level well above that needed for effective bluing purposes but at a level at which proper colorimetric measurements may be taken in order to predict, on a broader scale, proper bluing agents without first using extremely low loadings in target polyesters; such measurements as follows are thus intended to provide distinguishing features of the most preferred colorant for utilization as the desired polyester toner, although such readings will not necessarily be the same as those for the same colorant present in much lower levels associated with bluing agents generally) within a plaque of polyethylene terephthalate of dimensions 2 inches×3 inches×50 mil, exhibit a $\lambda_{max}$ of about 576 nm, with a maximum absorption of about 1.03, and a half-height bandwidth of about 96. Such a compound, as noted in greater detail below, thus provides excellent anti-yellowing, brightness (c value), grayness (L value; a low L value indicates a grayer result whereas a higher L value indicates improved whiteness), and hue angle (h value) (all under the CIELab standard measurements) results within desired clear polyester articles in excess of any previously taught bluing agents for such a purpose. Such a compound also does not appreciably affect the haze of the polyester resin and effectively combats yellowness of both the resin itself and the presence of UV absorbers as well. Furthermore, being a liquid, such a toner also can be added easily to the injection molding stage of the plastic manufacturing process, and can be stored conveniently within a solution or dispersion with the desired UV absorber for simultaneous and effective introduction within such a manufacturing procedure. As such, this bluing agent, being merely one example of the potentially workable class of such colorants, meets all of the necessary requirements noted above.

The UV absorbers possible within this invention, either for separate addition to the target polyester resin or for solution or dispersion formulation for simultaneous introduction within the manufacturing process itself for resin production, include any well known types for such polyesters. Thus, Ciba Specialty Chemicals additives, such as benzotriazole types (under the tradename TINUVIN® or SHELFPLUS®) or those offered by Milliken & Company under the tradename CLEARSHIELD®, and disclosed within U.S. patent application Ser. No. 09/934,377, for example, may be present for such a purpose within the target polyester fiber and/or article. Such UV absorbers are highly effective in preventing UV exposure to the resin itself or to any stored materials within such polyester articles. Again, though, such additives inherently exhibit yellowing problems within non-colored resins and thus require the presence of bluing agents to provide not only a highly effective UV block, but also an aesthetically pleasing article.

The term polyester thermoplastic material (or composition or resin) is intended to encompass any polyester, including co-polymers of different polyesters, thermoplastics comprised of a majority of polyester constituents, and a single polymer of polyester (i.e., polyethylene terephthalate, which is the preferred species). Feedstock is intended to encompass virgin or recycled polyester, whether in shredded, chipped, pelletized, or any like form. The term thermoplastic is well known in the art to mean a polymeric material which will melt upon exposure to sufficient heat but will retain its solidified state, but not prior shape without use of a mold, upon sufficient cooling. The inventive colored polyester thermoplastic is intended to be utilized ultimately as, for instance and not by limitation, containers for soft drinks, beer, liquor, water, and the like, as well as containers for any solid materials.

Further criteria which the particular inventive toner exhibits includes thermal stability while undergoing high melting temperatures during the extrusion process; no degradation of the polyester either during processing or once the final product is made; cost effectiveness so as not to translate into higher prices for the consumer; transparency of the polyester is uniform throughout the entire finished product; low viscosity in order to permit better processing conditions; homogeneity of dissolution of the toner within the polyester; and substantially no migration of the toner from and within the finished polyester thermoplastic product. The inventive compound exhibits all of these necessary characteristics which thus shows the care and degree and analysis required in order to select the proper toner for introduction within the proper polyester resin.

The UV protected resin comprises about 0.01 to about 1% by weight of UV absorber within the target polyester. Preferably the amount of UV absorber is from about 0.05 to about 0.5% and most preferably from about 0.1 to about 0.3%. Optional additives may include plasticizers, such as PEG-400 and dibutyl phthalate, and the like, antistatic agents, stabilizers, and other similar standard polyester thermoplastic additives.

The inventive liquid solution or dispersion of bluing agent plus UV absorber may include a ratio by parts of the two components (with any needed solvents, viscosity modifiers, and the like, also permitted) anywhere from 0.001:100 to about 1:10. Preferably, such a range of ratios is from 0.01:100 to about 1:20, more preferably from about 0.05:100 to about 1:100, and most preferably from about 0.1:100 to about 1:150.

The method of producing the preferred clear non-yellowing resin may include any standard procedure, with the proviso that the added bluing agent should be able to withstand the high temperatures without subliming or degrading (due to a lack of complete thermal stability) at the point of introduction within the desired procedure. Thus, preferred, in order to best ensure proper addition and no thermal stability issues arise, is the introduction of the toner during the injection molding step for the target polyester article.

PREFERRED EMBODIMENTS OF THE INVENTION

Examples of particularly preferred resins are below, with comparisons to the best prior art types offered within the polyester market today.

Inventive Toner and Ready-to-Use Dispersions

EXAMPLE 1

The colorant listed as #1 from TABLE 1, above, was produced in accordance with the teachings of U.S. Pat. No. 4,507,407 and kept in a closed container. The colorant exhibited a violet shade and was liquid in nature, with a viscosity level of about 1300 cps at 32 degrees Celsuis.

EXAMPLE 2

14 parts of the colorant from EXAMPLE 1 were then admixed with 2000 parts of CLEARSHIELD® 400, a commercially available UV absorber solution from Milliken & Company. The resultant liquid was a stable homogeneous solution exhibiting a blue color.

EXAMPLE 3

10 parts of the colorant from EXAMPLE 1 were then admixed with 1000 parts of CLEARSHIELD® 390A, a commercially available UV absorber solution from Milliken & Company. The resultant liquid was a stable homogeneous solution exhibiting a blue color.

EXAMPLE 4

5 parts of the colorant from EXAMPLE 1 were then admixed with 2500 parts of TINUVIN® 327, a commercially available UV absorber solution from Ciba Specialty Chemicals. The resultant formulation was a powder that was then melt-blended into a polyester resin (as noted below) for ultimate introduction to a finished article during the injection molding step therefor.

Comparative Toners

COMPARATIVE EXAMPLE 1

In accordance with the preferred examples in U.S. Pat. No. 5,384,377, two different dyestuffs were produced for use as a combination of compounds for toning purposes. A blue dyestuff such as that disclosed in (examples 1 and 66) was first prepared. Example 1 of the patent disclosed the reaction of 1,4-bis-(2-ethyl-6-methylanilino)anthraquinone with chlorosulfonic acid to produce the disulfonyl chloride. This disulfonyl chloride was further reacted with ethanolamine to form the disulfamide. Example 66 disclosed the production of 1,4-bis-(2,6-dimethylanilino)-anthraquinone disulfonyl chloride and reacting that with secondary amine. 1,4-bis-(2,6-dimethylanilino)anthraquinone was made in accordance with the procedure of Carroll (Org. Prep. Proceed. Int. 19, 1, 1987, p 57). The blue dyestuff was chlorosulfonated and reacted with ethanolamine according to the procedure in example 1 of the patent. This type of blue colorant was especially difficult to manufacture due to the expense and toxicity of the reagents required as well as the high temperatures and low yields encountered in its synthesis.

COMPARATIVE EXAMPLE 2

The red dyestuff disclosed in the same patent (examples 93, 96, 103, 104, and 118–122) are all free acids or aliphatic esters of 1,5-bis-(o-carboxyanilino)anthraquinone. When added to PET in the melt phase, it is well known that transesterification occured rendering all of these colorants essentially equivalent in coloration. 1,5-bis-(o-carboxyanilino)anthraquinone was made according to U.S. Pat. No. 4,359,570. This dyestuff was transesterified with PEG-400 before incorporation into the target PET.

Other comparative examples included, in accordance with TABLE 2, below:

TABLE 2

| Comp. Ex. # | Bluing Agent (ppm if UV Abs. present) | UV Absorber (ppm) |
|---|---|---|
| 3 | Cobalt Acetate | — |
| 4 | Pigment Violet 15[1] | — |
| 5 | Pigment Blue 29[2] | — |
| 6 | Pigment Violet 16[3] | — |
| 7 | Comp. Example 3 (1000) | ClearShield 390A (1000) |
| 8 | Comp. Ex. 5 (75) admixed with Comp. Ex. 4 (187) | ClearShield 400 (2000) |
| 9 | Comp. Ex. 5 (3.6) admixed with Comp. Ex. 4 (21.7) | ClearShield 400 (2000) |
| 10 | Comp. Ex. 5 (43) admixed with Comp. Ex. 4 (235) | ClearShield 400 (2000) |

[1]Available from Holliday Chemicals under the tradename Ultramarine Violet Premier FVU
[2]Available from Holliday Chemicals under the tradename Premier DFRX
[3]Available from Holliday under the tradename 6139 Violet Premier VM Manganese Thermoplastic Part Formation The plastic additive was then introduced within an injection molding operation for a polyester thermoplastic, for instance polyethylene terephthalate. The plastic additive was blended via agitation onto hot, dried polyethylene terephthalate resin (available from M&G Polymers under the tradename ClearTuf® 8006)(in pellet form). The blend of additives and pellets was gravity fed into the feed throat of the machine. In the feed section, melting was accomplished through the utilization of a heated (heat transferred from the barrel of the machine) screw extruder which rotated. The rotation of the screw provided thorough mixing of the colorant and molten resin together producing a uniform plastic melt which was injected into a mold in order to form the thermoplastic article, for instance a 2 inch by 3 inch plaque with a uniform thickness of 50 mils.

Spectral Performance Evaluation

The bluing agents were evaluated at a loading that would provide a maximum absorbance of the colored component between 0.01 and 2.0 A (i.e., in sufficeint amounts to permit initial spectral performance in order to determine which toners met the required characteristics of, at least, $\lambda_{max}$ measurements, as one example). The spectral performance was performed by adding the additive into polyester in the method described above. The absorbance characteristics were measured on a Perkin-Elmer Lambda 35 UV-Vis Spectrometer with a 50 mm Integrating Sphere. The maximum absorbance and the wavelength at maximum absorbance were measured using the Perkin-Elmer WinLab software. The half-height bandwidth was calculated by manually determining the width of the absorbance curve at the midsection of the height of the maximum absorbance. The spectral performance of the inventive and comparative examples are shown in Table 3 (Max. Abs. Indicates the maximum absorption of the bluing agent and HHBW is the half-height bandwidth)(the last comparative example below is a mixture of the first two comparative examples in accordance with the preferred bluing agent of U.S. Pat. No. 5,384,377, and Comparative Example 1 within this combination exhibits two $\lambda_{max}$ absorption peaks):

TABLE 3

| Bluing Agent | Loading (ppm) | $\lambda_{max}$ (nm) | Max. Abs. | HHBW (nm) |
|---|---|---|---|---|
| Example 1 (Comparatives) | 300 | 576.1 | 1.0293 | 95.8 |
| Comp. Example 4 | 300 | 517.9 | 0.069 | 125.0 |
| Comp. Example 5 | 300 | 594.96 | 0.015 | 120.8 |

TABLE 3-continued

| Bluing Agent | Loading (ppm) | $\lambda_{max}$ (nm) | Max. Abs. | HHBW (nm) |
|---|---|---|---|---|
| Comp. Example 3 | 2000 | 569.27 | 0.160 | 122.9 |
| Comp. Example 1 | 300 | 622.2/579.9 | 0.851/0.824 | 108.3 |
| Comp. Example 2 | 1500 | 512.9 | 2.15 | 95.8 |
| Comp. Exs. 1 and 2 | 1 (529); 2 (1046.5) | 533/573.1/ 622.2 | 1.74/1.63/ 1.41 | 168.5 |

As initial indications, it is evident that the inventive bluing agent provides the needed lambda max measurement to best combat yellowing as needed within polyester. Neither of the Holliday pigments provided this required absorption wavelength. The HHBW of each of the these pigments and cobalt acetate are excessive, particularly for the amount of cobalt acetate needed to accord a high enough absorption level for proper functioning. The comparative agent combination exhibiting three substantial peaks, with the lower wavelength, well outside the range needed for anti-yellowing, exhibited the highest level of such undesirable properties. The HHBW thereof was accordingly extremely broad. These agents were then tested for colorimetric purposes within the target polyesters at these higher levels were then made as an initial screen for proper end results.

The colorimetric data of the bluing agents in the 50 mil polyester parts was measured using a Gretag-Macbeth ColorEye 7000A Spectrophotometer. The reflective colorimetric data, specifically L*, indicating the lightness/darkness, c*, indicating chroma, and the h°, indicating hue angle (wherein a measurement closer to 270 indicates a bluer color), are shown in Table 4:

TABLE 4

| Bluing Agent | Loading | L* | c* | h° |
|---|---|---|---|---|
| Inventive Example (Comparative) | 300 | 38.4 | 70.7 | 292.2 |
| Comp. Exs. 1 and 2 | 1 (529); 2 (1046.5) | 27.8 | 17.9 | 294.6 |

These vastly different measurements for each sample thus indicates the possibility that the inventive single compound will provide better brightness, and grayness properties, at least, to the target polyester upon utilization at bluing agent levels. Highly desired are higher L* and c* values, which indicate brighter appearances within finished polyester articles.

Bluing Agent Performance Evaluation

The performance of the bluing agents was evaluated by adding an ultraviolet light-absorbing compound and a bluing agent to the polyester pellets and injection molding a 2 inch by 3 inch plaque with a uniform thickness of 175 mils or 50 mils (as noted below). The colorimetric data, Yellowness Index, and haze were measured on the 175 mil plaques. The Yellowness Index, as defined in ASTM E313, is a measure of how far an object departs from a preferred white towards yellow. The colorimetric data and Yellowness Index was measured using a Gretag-Macbeth ColorEye 7000A Spectrophotometer. The haze was measured using a BYK Gardner Haze-Gard Plus Hazemeter. The yellowness levels should be as low as possible in order to provide a substantially non-yellow resin. Haze, as noted above, should be as low as possible as well in order to provide as clear an article as possible. The L* value should be as high as possible to indicate the needed low dulling of the resin, and the a* and b* values should be as close to 0 as possible to provide a non-coloring result. The bluing agent performance is shown in Table 5:

TABLE 5

| UV Abs. + Bluing Agent (ppm) | Yellowness Index | Haze | L* | a* | b* |
|---|---|---|---|---|---|
| (in 175 mil plaques) | | | | | |
| None | 1.5 | 8.7 | 92.2 | −0.22 | 1.23 |
| ClearShield 400 (2000) alone | 17.8 | 13.1 | 90.6 | −2.46 | 13.9 |
| Example 2 | 0.42 | 12.2 | 82.2 | −0.52 | 0.53 |
| Comp. Example 8 | −0.48 | 38.2 | 81.4 | −2.01 | 0.64 |
| Comp. Example 9 | 16.4 | 18.6 | 90.1 | −2.24 | 12.7 |
| Comp. Example 10 | 1.9 | 45.7 | 82.9 | −0.31 | 2.13 |
| Example 4 | −0.59 | 10.8 | 88.1 | −0.46 | −0.28 |
| (in 50 mil plaques) | | | | | |
| None | 0.89 | 2.16 | 94.7 | −0.14 | 0.76 |
| ClearShield 390A (1000) alone | 6.5 | 2.03 | 94.6 | −1.2 | 5.1 |
| Example 2 | 1.9 | 2.07 | 92.1 | −0.65 | 1.6 |
| Comp. Example 7 | 0.71 | 2.57 | 90.2 | −0.18 | 0.9 |

Thus, it is evident that the inventive single compound liquid colorant provides the most effective bluing characteristics for polyester resins as well as meeting all other requirements for broad utilization within such articles, most notably at very low loadings such an inventive bluing agent provides low haze, effective yellowness, and high brightness, at least. Furthermore, considering the loading levels required of such standard bluing agents as cobalt acetate to effectuate the needed level of anti-yellowing, it is no surprise that haze is compromised and brightness is reduced, particularly as compared with the inventive additive which requires a very small amount to a greater degree of bluing, anti-yellowing, brightness, grayness, and improved haze.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A clear polyester fiber or article comprising at least one bluing agent and optionally at least one ultraviolet absorbing compound; wherein said bluing agent exhibits a single absorption peak and a $\lambda_{max}$ between 565 and 590 nm within said clear polyester fiber or article; wherein said bluing agent exhibits a half-height band about of at most 115 nm in relation to said single absorption peak; and wherein said clear polyester fiber or article is colorless within the visible spectrum.

* * * * *